United States Patent
Nene et al.

(10) Patent No.: US 12,469,106 B2
(45) Date of Patent: Nov. 11, 2025

(54) GENERATING TRAINING DATA FOR SUPER RESOLUTION MODELS AND GENERATING TRAINED SUPER RESOLUTION MODELS

(71) Applicant: MICROSOFT TECHNOLOGY LICENSING, LLC, Redmond, WA (US)

(72) Inventors: Sameer Avinash Nene, Redmond, WA (US); Keith David Melmon, Redmond, WA (US); Jack Andrew Elliott, Auckland (NZ); Chulian Zhang, Sunnyvale, CA (US); Jingyang Xue, Sunnyvale, CA (US); Michael George Boulton, Seattle, WA (US); Matthew Lawrence Bronder, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 18/144,629

(22) Filed: May 8, 2023

(65) Prior Publication Data
US 2024/0378694 A1   Nov. 14, 2024

(51) Int. Cl.
*G06T 3/4053* (2024.01)
*A63F 13/52* (2014.01)
*G06N 3/084* (2023.01)
*G06T 11/00* (2006.01)

(52) U.S. Cl.
CPC ............ *G06T 3/4053* (2013.01); *A63F 13/52* (2014.09); *G06N 3/084* (2013.01); *G06T 11/00* (2013.01)

(58) Field of Classification Search
CPC ...... G06T 3/4053; G06T 11/00; G06T 3/4046; A63F 13/52; G06N 3/084; G06V 10/774
See application file for complete search history.

(56) References Cited

U.S. PATENT DOCUMENTS

2021/0150669 A1*   5/2021   Potapov ................. G06T 3/4053

FOREIGN PATENT DOCUMENTS

CN            115546019 A   * 12/2022

OTHER PUBLICATIONS

Devkota et al., "Deep Learning based Super-Resolution for Medical Volume Visualization with Direct Volume Rendering," arXiv, Oct. 14, 2022, 12 Pages.
International Search Report and Written Opinion received for PCT Application No. PCT/US2024/026727, (MS#412707- PCT01) Aug. 6, 2024, 13 pages.

(Continued)

*Primary Examiner* — William A Beutel
*Assistant Examiner* — Chris Alejandro Puntier
(74) *Attorney, Agent, or Firm* — Workman Nydegger

(57) ABSTRACT

Systems are provided for generating training data from images that are obtained from image generators that are typically configured to only generate a single image per frame. The image generators are modified or otherwise controlled to generate two different images at different resolutions for each of a plurality of frames. The training data is created by pairing the low-resolution images and high-resolution images for common frames into training data set pairings. A super-resolution model is applied to the training data set pairings to create a trained super-resolution model.

19 Claims, 9 Drawing Sheets

Super-Resolution Training & Processing Flow
300

(56) References Cited

OTHER PUBLICATIONS

Xiao et al., "Neural Supersampling for Real-time Rendering," ACM Transactions on Graphics, vol. 39, Jul. 8, 2020, pp. 1-12.

Yang et al., "MNSS: Neural Super sampling Framework for Real-Time Rendering on Mobile Devices," IEEE Transactions on Visualization and Computer Graphics, vol. 30, Mar. 20, 2023, pp. 4271-4284.

* cited by examiner

GENERATING TRAINING DATA FOR SUPER RESOLUTION MODELS AND GENERATING TRAINED SUPER RESOLUTION MODELS

BACKGROUND

With conventional image processing, it is possible to render images at a variety of display resolutions. This is particularly beneficial for enabling content that is saved at one resolution to be rendered at different resolutions on a plurality of different display devices having different display capabilities. For example, images that are saved at low resolutions can be upscaled to higher resolutions for display on high-resolution displays.

The upscaling of images is sometimes referred to as super-resolution processing. With super-resolution processing, a higher resolution image of a base image is generated by rendering the base image with a higher pixel density than the underlying base image. For example, a base image having a 2K resolution (1920×1080 pixel resolution) can be upscaled to a 4K resolution image (3840×2160 pixel resolution) by converting each of the pixels in the base image into four new upscaled pixels.

Super-resolution processes utilize specialized algorithms that are configured to generate outputs comprising new details for the newly upscaled pixels, which are not present in the underlying pixels, and such that the new upscaled pixels are not mere duplicates of the underlying base pixels from which they depend. By way of example, each of the new pixels in an upscaled image will usually contain a unique set of properties that are derived from some combination of the underlying base pixels' properties, as well as the properties of the neighboring pixels that are contained within the base image and, in some instances, the new pixel properties will also be based at least in part on the properties of other new neighboring pixels of the upscaled image.

Many different types of super-resolution algorithms and techniques can be used to upscale and enhance an image. For instance, some super-resolution processes can be used to smooth out the edges of the new pixels that are being generated. Some super-resolution processes can also be used to cause the final upscaled images to appear more detailed than the underlying images from which they are based. The super-resolution model algorithms can be tuned for different desired outcomes and styles by controlling algorithm weights applied to control variables or parameters of the algorithms that are based on attributes of the images being processed.

Recent developments in computer technologies include the creation of machine learning models that can be trained to perform various tasks, including upscaling and other forms of super-resolution image processing. Super-resolution machine learning models, for example, can be configured with one or more of the super-resolution processing algorithms that are trained to perform super-resolution processing on a particular type or class of lower-resolution images by applying the models to training data that comprises pairs of low-resolution and high-resolution images and in such a manner as to consistently generate images of a high-resolution based on inputs comprising low-resolution images, similar to the training data.

The use of super-resolution models for assisting with image upscaling is particularly helpful in the gaming industry since many gaming engines are configured to produce initial image outputs that are oftentimes generated at initial resolutions that are lower than the high-resolution displays where the gaming content is rendered.

The more training that the super-resolution models undergo for different end-use scenarios (e.g., desired upscaling, image formatting, image rendering styles), the better the models can perform in generating the desired outputs during runtime. Because different gaming systems are configured to process images with different styles and formats, the super-resolution models need to be trained with training data that is similar to the image content that will be processed by the different gaming systems for each end-use scenario.

Unfortunately, it can be difficult to obtain high-quality training data for super-resolution processing, particularly for all of the different end-use scenarios. Accordingly, any improvements in the manner in which high-quality training data can be obtained for training machine learning models are desired.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments include techniques for generating training data, and the use of that training data, for training machine learning models that are configured for performing super-resolution image processing.

In some embodiments, an image generator, such as a gaming engine is accessed and modified or otherwise controlled to obtain image output comprising a first image at a first resolution and a second image at a second and higher resolution for each frame of a plurality of frames that are selected from a sequential series of frames of image data.

In some instances, the image generator is initially configured to output images at only a single resolution for each frame of image data at a time. However, once modified, the image generator is enabled to simultaneously generate and output two images at different resolutions for each frame of image data being processed.

Training data is finally generated by pairing the lower and higher-resolution images into image pairings corresponding to common frames. Supplemental image processing data, such as motion vector data, jittered image data, depth data, and antialiasing data can also be provided with the training data image pairings.

Once the training data is prepared, a super-resolution model is applied to the training data by using the lower-resolution images of the image pairings and, optionally, the supplemental imaging data as inputs to algorithms of the super-resolution model. This process causes the super-resolution model to generate high-resolution output images based on the low-resolution input images and, optionally, the supplemental image processing data that is contained in the training data. Then, the high-resolution output images produced by the model are compared to the corresponding high-resolution images contained in the image pairings to identify error data that is used to modify or otherwise tune the weights of the algorithms of the super-resolution model to thereby improve the performance of the super-resolution model.

Performance improvements resulting from the training can include a convergence of similarity between a desired target output and the actual output from the model. Performance improvements can also include an increase in processing efficiency (e.g., lower computational cost) for performing the super-resolution processing. In this manner, the training data can be used to generate a trained super-resolution model that has improved performance relative to the super-resolution model prior to undergoing the training.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
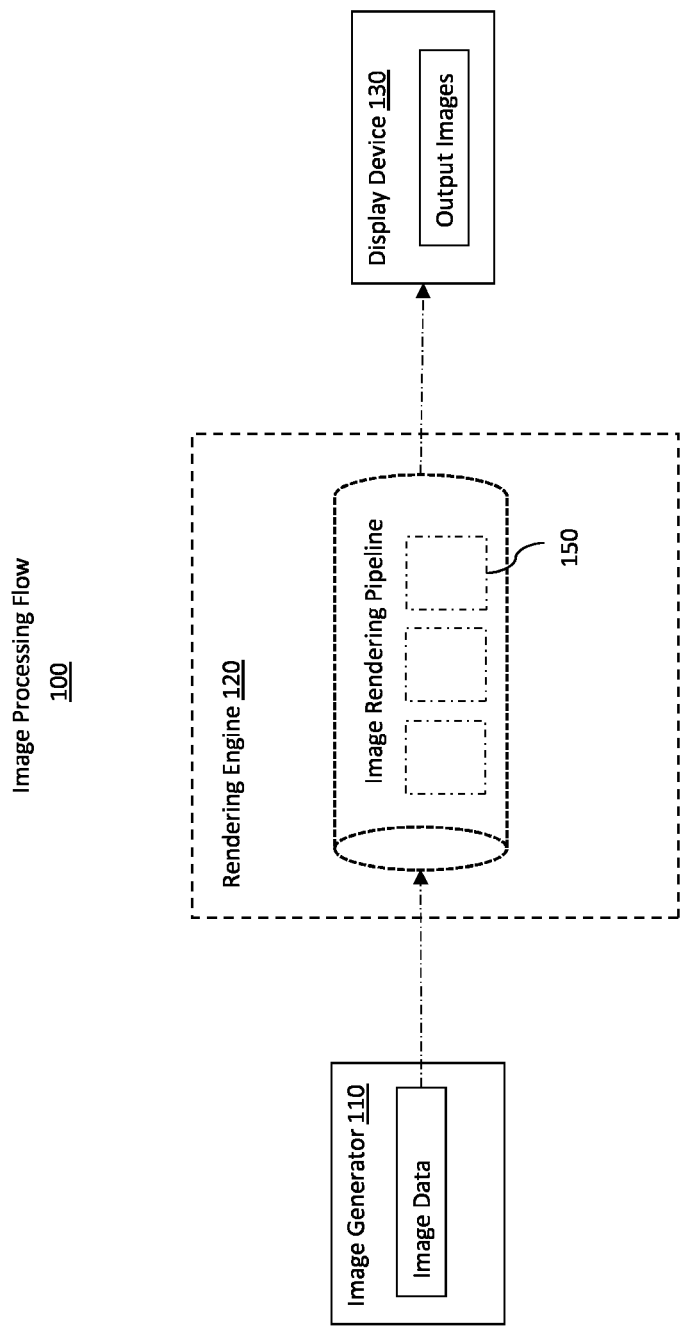
FIG. 1 illustrates an example of an image processing flow associated with the generation of images from an image generator.

As noted above, the disclosed embodiments include methods and systems for generating and using training data for training super-resolution models, wherein the training data comprises image pairings that include a low-resolution image and a corresponding high-resolution image for common frames of image data. An image pair comprises a low-resolution image and a high-resolution image depicting the same scene.

The image pairings are generated, in some embodiments, by modifying an image generator that was initially configured to generate image output in only a single resolution at a time. The modification to the image generator enables the substantially simultaneous generation of two sets of images in different resolutions. The substantially simultaneous generation of the two sets of images may occur at exactly the same periods of time or, alternatively, at different periods of time that are at least partially overlapping, such as with parallel processing by the image generator. In some instances, substantially simultaneous generation of the two sets of images may also include generating the two sets of images contemporaneously, within seconds or minutes of each other, in sequential processing, but wherein both sets of images at different resolutions are still based on the same shared content (e.g., scenes or frames).

The two sets of images can then be paired together into training data. In particular, a low-resolution image and a corresponding high-resolution image for a plurality of different frames of image data are paired together as training data for training a super-resolution model. The paired images can include all image data that is generated (e.g., low-resolution and high-resolution images for each of the plurality of different frames) or, alternatively, for only a subset of the image data that is generated (e.g., low-resolution and high-resolution images for only some of the plurality of the different frames generated). Additionally, the paired image data can include the entirety of the paired low-resolution and high-resolution images, or alternatively, only limited corresponding sub-portions of the paired low-resolution and high-resolution images.

The super-resolution model is trained by applying the super-resolution model to the training data. With this training, the super-resolution model is tuned to generate high-resolution images, with resolutions that are the same as or similar to the high-resolution images in the image pairings having the same quality or resolution attribute, based on new input low-resolution images, with resolutions that are the same as or similar to the low-resolution images in the image pairings.

References to the images having the same or similar resolutions mean that the resolutions have the same or similar sharpness, clarity, and/or pixel density. If the resolutions are the same, for example, then they are identical (i.e., they have identical sharpness, clarity, and/or pixel density). If the resolutions are similar, then then the sharpness, clarity, and/or pixel density of one resolution is within 99%, 98%, 97%, 96%, 95%, between 95%-90%, between 85%-80% of the corresponding sharpness, clarity and/or pixel density of the comparable resolution.

By modifying existing image generators, such as gaming engines and other imaging engines that are capable of generating streaming sequential frames of image data, to generate two separate streams of output at different resolutions, it is possible to generate large volumes of high-quality training data a relatively low cost, particularly when compared with conventional systems that curate the different image pairings from static image captures.

Attention is now directed to FIG. 1. As shown, an image processing flow 100 includes an image generator 110 processing image data that is fed through an image rendering pipeline of a rendering engine 120 for preparing output images configured for rendering on a display device 130 with a desired format and at a desired resolution.

The image data may comprise actual images that are created by the image generators. In some instances, for example, the image generator is a gaming engine that executes a game simulation or other application execution that generates image data structures that define attributes and properties of the images to be generated. Additionally, or alternatively, the image generators can generate visualizations of the image data that are rendered on a connected display device.

The rendering engine 120 may be a stand-alone software module that utilizes hardware, such as a graphics processing unit (GPU) or other hardware components. The rendering engine 120 may be integrated into the image generator (e.g., gaming engine) and/or display device and/or an intermediary system interposed between the image generator and end-user display device.

The processes performed by the rendering engine 120 may include various discrete processes for altering the attributes of the images being processed. By way of example, the image rendering pipeline of the rendering engine 120 may include image processing such as processing that modifies or applies a particular style, format, orientation, coloring, contrast, brightness, filtering, masking and/or other imaging transformation to the images being processed.

One of the imaging processes that may be performed by the rendering engine 120 is super-resolution processing performed by a super-resolution machine learning model (e.g., super-resolution model 150). The super-resolution model 150 includes algorithms, described below, which are used by the super-resolution model 150 for upscaling a low-resolution image into a high-resolution image. Super-resolution processing that is performed by the super-resolution model 150 may also include other related imaging processes, such as anti-aliasing. A list of examples of super-resolution machine learning models that may be used is: Laplacian Pyramid Super-Resolution network (LapSRN), Fast Super-Resolution Convolutional Neural Network (FSRCNN) and Efficient Sup-Pixel Convolutional Neural Network (ESPCN).

Figure 2:
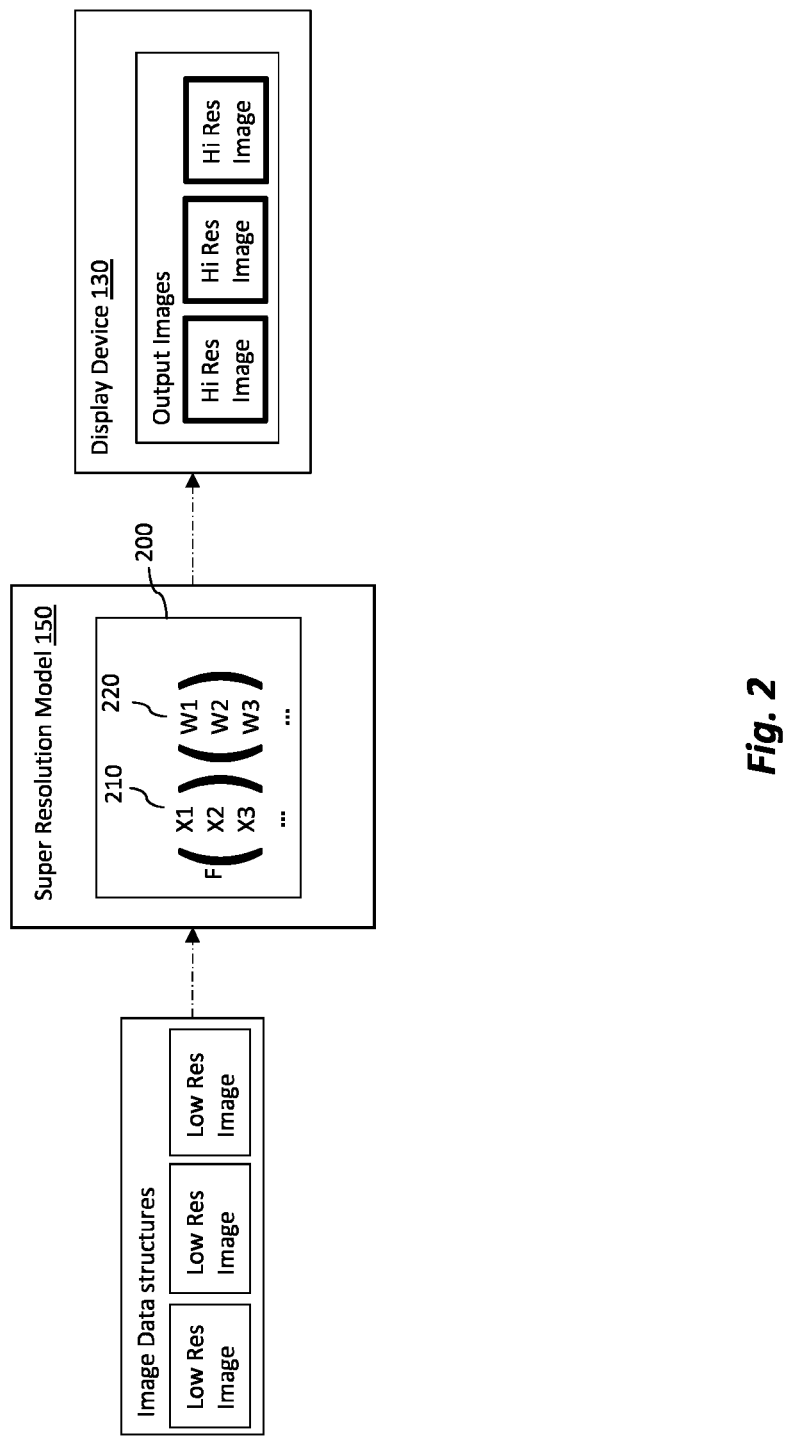
FIG. 2 illustrates an example of a super-resolution processing flow associated with a machine learning model performing super-resolution on low-resolution images to generate corresponding high-resolution images.

FIG. 2 illustrates one example of a super-resolution processing flow in which low-resolution images are upscaled into output images comprising high-resolution images, based on the low-resolution images, and which are prepared for rendering on a display device 130.

As shown, the upscaling is performed by a super-resolution model 150 that comprises one or more algorithms 200 having parameters 210 that are based on image attributes of the low-resolution images and weights 220 that are applied to the various parameters 210 to control how the parameters are applied by the algorithms 200. During the training of the super-resolution model, the weights can be modified, as shown in FIG. 3.

Figure 3:
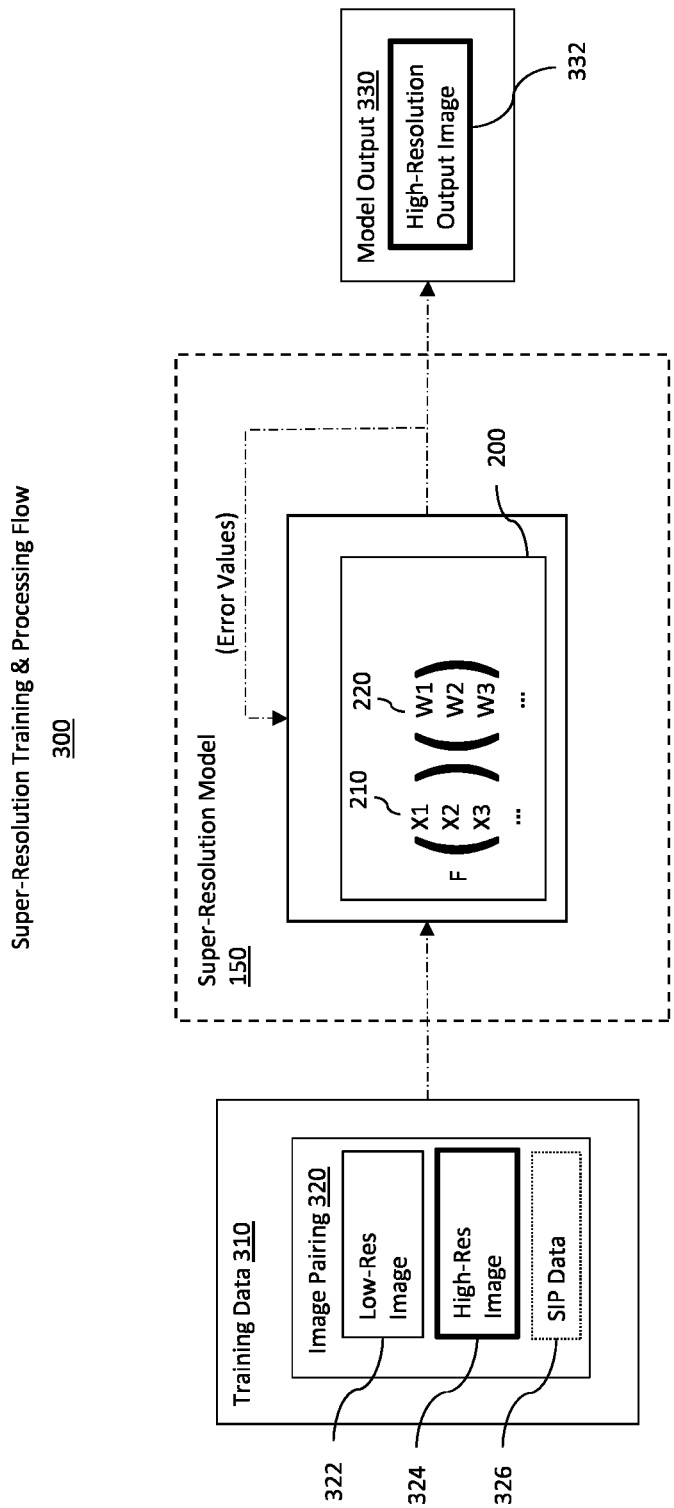
FIG. 3 illustrates an example of a super-resolution training and processing flow of a super-resolution model that is applied to training data comprising low and high-resolution image pairings.

FIG. 3 illustrates a super-resolution training and processing flow 300 in which the super-resolution model 150 is applied to training data 310. The training data includes image pairings 320 of low-resolution images (322) and high-resolution images (324) of the same content (e.g., the same scene or image frame at different resolutions). The training data may also include options for supplemental image processing (SIP) data 326, which will be discussed in more detail below, with reference to FIG. 7, and which can include motion vector data, jittered image data, anti-aliasing data, and other supplemental information. The supplemental image processing data is available from the image generator. In some instances, the image generator comprises a video codec which processes the images generated by the image generator and as part of the encoding computes motion vector data, jittered image data, depth data, and antialiasing data for the images. This SIP data is used by the super-resolution model, with a low-resolution image, to generate a corresponding high-resolution image that omits aliasing and jitter artifacts that can sometimes result from upscaling images. By including the SIP data in the training data 310, the super-resolution model 150 is trained to compensate for jitter and aliasing effects when comparing the low-resolution image and the high-resolution image in the image pairing 320 supplied with the SIP data.

During training, the algorithms 200 of the super-resolution model 150 are applied to the training data by using the low-resolution image attributes as inputs for the parameters 210. The weights 220 used by algorithms of the model are then adjusted to account for error values that are detected between the final model output 330, such as the differences between the high-resolution output image 332 and the corresponding high-resolution image 324 from the training data image pairing 320. The weights 220 will continue to be modified as the model is applied to different training data 310, thereby causing the model to proceed along a gradient descent to a desired threshold of convergence in the similarity between the output generated by the model (e.g., high-resolution output image 332) compared to a desired target output (e.g., output represented by high-resolution image 324 in the training data).

Figure 4:
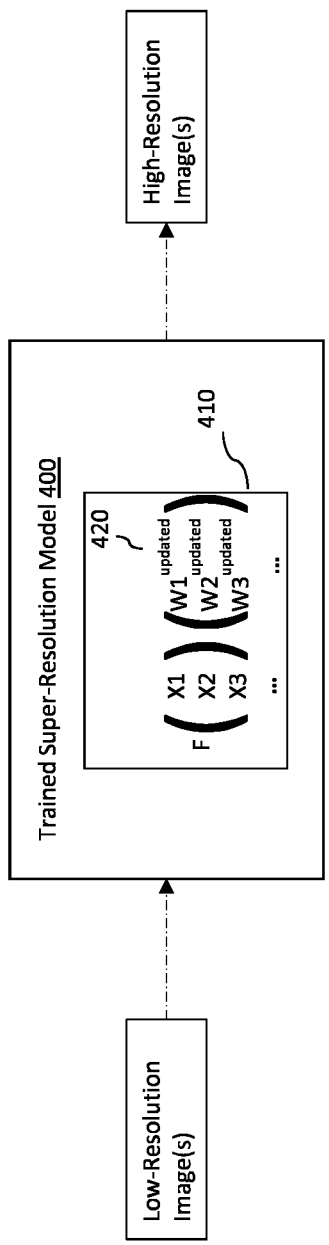
FIG. 4 illustrates an example of a super-resolution processing flow associated with a trained machine learning model performing super-resolution on low-resolution images to generate corresponding high-resolution images.

As a result of the training, the super-resolution model 150 is tuned or modified into a trained super-resolution model 400, as shown in FIG. 4, with a modified set of algorithms 410 which are similar to the original algorithms 200 of the untrained super-resolution model, but which have updated weights 420 that cause the trained super-resolution model 400 to perform at an increased level of performance relative to the untrained super-resolution model 150, meaning the high-resolution images are generated more efficiently or more accurately to a desired, target output from the low-resolution images than was possible with the untrained super-resolution model 150. Said another way, the trained super-resolution model 400 has achieved a greater level of convergence associated with the output generated by the trained super-resolution model 400 than the output generated by the untrained super-resolution model 150, when compared to a desired target output.

As noted earlier, one problem with training super-resolution models is obtaining sufficient training data for the different end-use scenarios that a model may be applied to. Some systems for obtaining training data include the creation of two images at different resolutions by taking a first image and then upscaling that image into a second image and then pairing those images together as training data. However, this can be a very time-intensive process.

To help address the foregoing problem, the disclosed systems and techniques include the modification of existing image generators, such as gaming engines, to automatically generate pairs of images at different resolutions.

Conventional gaming engines are configured to only output one resolution of images at a time, with the output images being rendered on a display during game generation or simulation, for example. However, by modifying the code of the gaming engines to output to two different outputs at a time, it is possible to cause the gaming engines to simultaneously output one image at a first resolution and a second image at a second resolution for any selected frames of the image content that are being generated or processed by the gaming engines.

The term gaming engine is a term of art for a type of application that provides many functions related to the generation of games, including animations, physics simulations, audio integration, application interfacing, and image processing. Most gaming engines include or interface with a rendering engine that is configured to process image data (e.g., geometry, viewpoint, texture, lighting, shading, coloring) for generating visualizations or output images corresponding to the image data. For at least this reason, this disclosure will broadly use the term image generator to refer to a gaming engine, rendering engine, or any other application that is configured to generate images from underlying image models. In particular, a rendering engine is an application that generates images from 2D or 3D models configured as scene files containing objects in a strictly defined computer language or data structure. The rendering engine creates image structures from the models and formats the structures as visualizations for rendering on a display. Some rendering engines are integrated into larger software applications, such as gaming engines, that are configured to not only create the visualizations from the underlying image objects and models but to also create and generate the underlying objects and models. During runtime, the gaming engine also generates animations of output images that are related to gameplay in response to user interactions within a game that is being executed by the gaming engine.

During the generation and simulation of a game or other application by an image generator, images will be generated and output as a plurality of discrete frames in a sequential stream of frames for rendering at a desired framerate (e.g., at a 30 FPS-60 FPS rate). For example, during the runtime of a game, a rendering engine can be used to generate output images that are rendered as animations of the gameplay on a display device. The resolution and framerate in which the images are rendered will be based on the particular resolution and capabilities associated with the display device, as well as the output settings of the rendering engine.

There are many different types of gaming engines, such as, for example, Unreal Engine (™), Amazon Lumberyard (™), CryEngine (™), Unity, GameMaker: Studio, Incredibuild, and so forth. To generate the images the gaming engine may have a complex 3D mesh model or other model of a scene and objects in the scene. The gaming engine has to render from the complex 3D mesh model to compute the images which is a resource intensive task.

Currently, no conventional gaming engine is being used to generate image training data sets for training super-resolution models to perform upscaling in the manner described herein. In particular, no conventional gaming engine is currently used for generating two sets of images at different resolutions for each frame of a plurality of different frames processed by or generated by the gaming engine and which are paired into image pairings for training data to train a super-resolution model. Other types of rendering engines, beyond gaming engines, have also not been used to generate two sets of images at different resolutions for each frame of a plurality of different frames processed by or generated by the rendering engine and which are paired into image pairings for training data to train a super-resolution model. Instead, conventional gaming engines, and other similar image generators, are configured to merely output images at only a single resolution at a time. While conventional image generators enable a user to select a desired output resolution from multiple different possible output resolutions, they do not enable a user to select multiple different output resolutions to generate, and particularly not for outputting different resolutions of the images having the same or similar content simultaneously.

Figure 5:
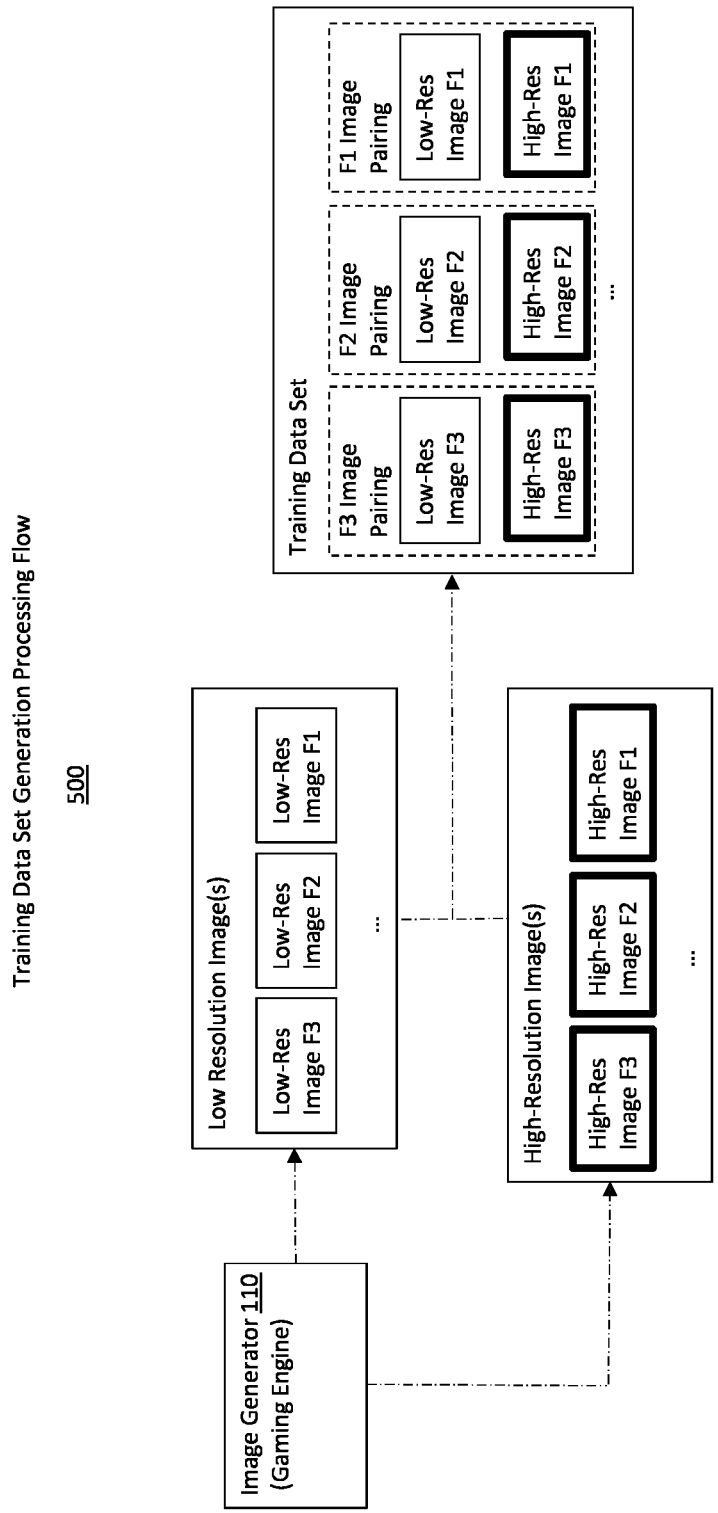
FIG. 5 illustrates an example of a processing flow associated with generating training data sets comprising low and high-resolution image pairings, wherein the high and low-resolution images of the image pairings are generated substantially simultaneously by an image generator.

Attention is now directed to FIG. 5. This illustration shows a training data set generation processing flow 500 in which an image generator 110 (such as a gaming engine) is modified to substantially simultaneously generate two sets of images, including a first set of images at a low-resolution and a second set of images at a high-resolution for each frame of a plurality of frames. For example, as shown, the image generator 110 generates low-resolution images that include a different low-resolution image for a plurality of frames (e.g., Low-Res Image F1 for frame 1, Low-Res Image F2 for frame 2, Low-Res Image (F3) for frame 3), as well as a different high-resolution image for the same plurality of frames (e.g., High-Res Image F1 for frame 1, High-Res Image F2 for frame 2, High-Res Image (F3) for frame 3).

The system interfacing with or including the image generator 110 is also used to pair the different images together into one or more training data sets of image pairings for training a super-resolution model.

The image pairings of the training data set(s), as previously described, include a low-resolution image and a corresponding high-resolution image pairing for a common frame of image data. By way of example, the illustrated training data set includes an F1 image pairing of the Low-Res Image F1 for frame 1 and the corresponding High-Res Image F1 for frame 1 that were substantially simultaneously generated by the image generator 110. The training data set also includes a plurality of additional image pairings for different frames that are selected from a plurality of sequential frames in a stream of frames being generated by or processed by the image generator.

In some instances, the training data set includes hundreds or thousands or tens of thousands of image pairings to accommodate different needs and preferences for training data sets. It has been found that thousands or tens of thousands of image pairings in a dataset may be sufficient to train a super-resolution model to a desired threshold of convergence. However, the scope of the disclosure is not limited to any particular quantity of image pairings that can be included in a training data set. For instance, it is also possible to generate a training data set of hundreds of thousands of image pairings using the disclosed techniques.

The code of the image generator 110 can be modified to enable the simultaneous generation of the images at different resolutions. New image generators can also be built with the functionality to simultaneously generate images at different resolutions.

With regard to the foregoing, it is noted that the terms low-resolution and high-resolution are relative, such that any resolutions can be used for the different image sets, as long as the resolutions of the image sets are different, with one resolution being higher than the other. In some instances, the low-resolution image set comprises a 2 k resolution (i.e., 1920×1080 pixel resolution), or lower, and the high-resolution image set comprises a 4 k resolution (i.e., 3840×2160 pixel resolution), or even a higher resolution, such as an 8 k resolution.

Figure 6:
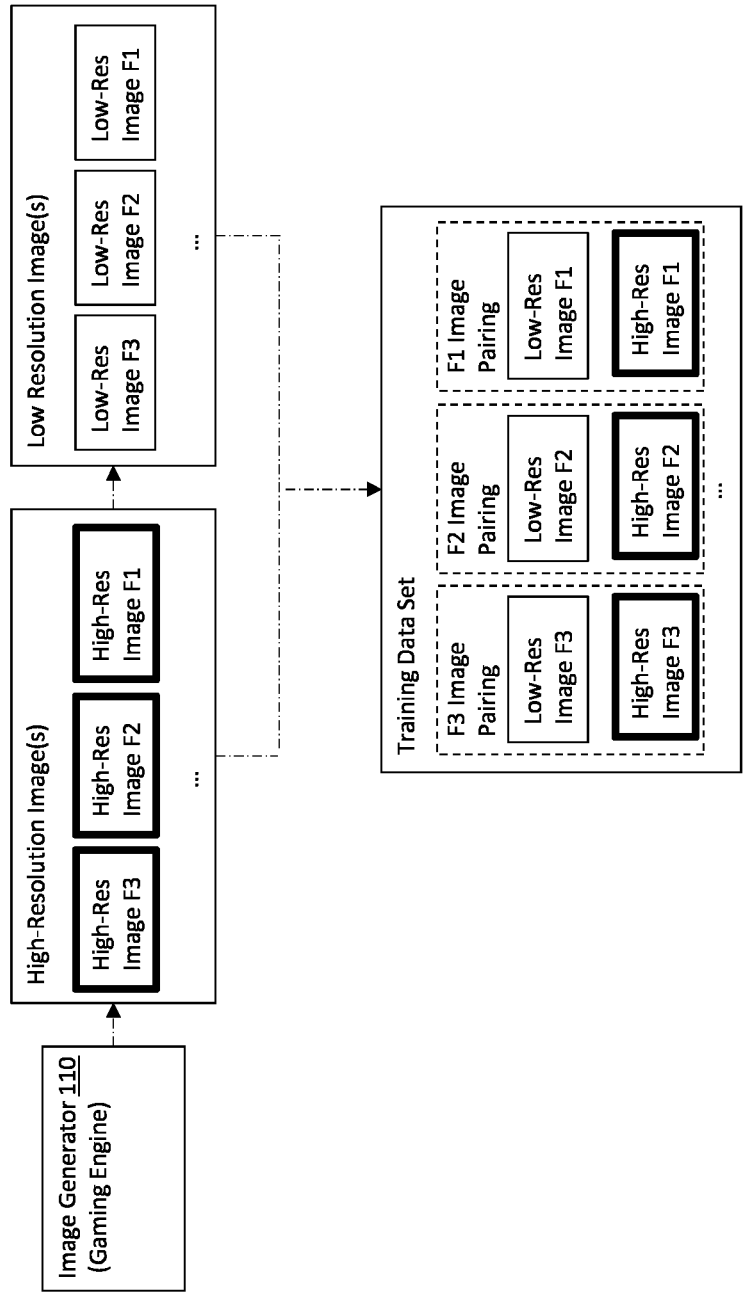
FIG. 6 illustrates an example of a processing flow associated with generating training data sets comprising low and high-resolution image pairings, wherein the high and low-resolution images of the image pairings are generated in series by an image generator.

Attention is now directed to the training data set generation flow 600 of FIG. 6. This flow is enabled by embodiments in which the image generator 110 is capable of operating in a special rendering mode in which the image generator 110 guarantees exact replication of frames for subsequent runs of a gameplay or a simulation at different resolutions, such that frames of the subsequent runs can be exactly matched at their different resolutions.

In this example, the image generator 110 is configured to generate two different sets of images at different resolutions asynchronously, in series. For example, the image generator 110 can generate a first set of low-resolution images for a plurality of frames during a first run and prior to generating a corresponding second set of high-resolution images for the same plurality of frames during a subsequent execution or simulation of the gameplay. Alternatively, although not shown, the image generator 110 can also generate the set of low-resolution images subsequent to generating the set of high-resolution images.

Regardless of which image data set is generated first, the system interfacing with or incorporating the image generator 110 will pair up the corresponding high and low image resolution images for each common frame that is generated by the image generator 110 into the different image pairings of the training data set. For example, the illustrated training data set includes a plurality of image pairings of low and high-resolution images corresponding to common frames.

The pairing of the images can include creating new files or other data structures that include both images at different resolutions in a single storage location. Alternatively, image pairing may be a pointer data structure that simply references the two images that are handled and stored separately.

Figure 7:
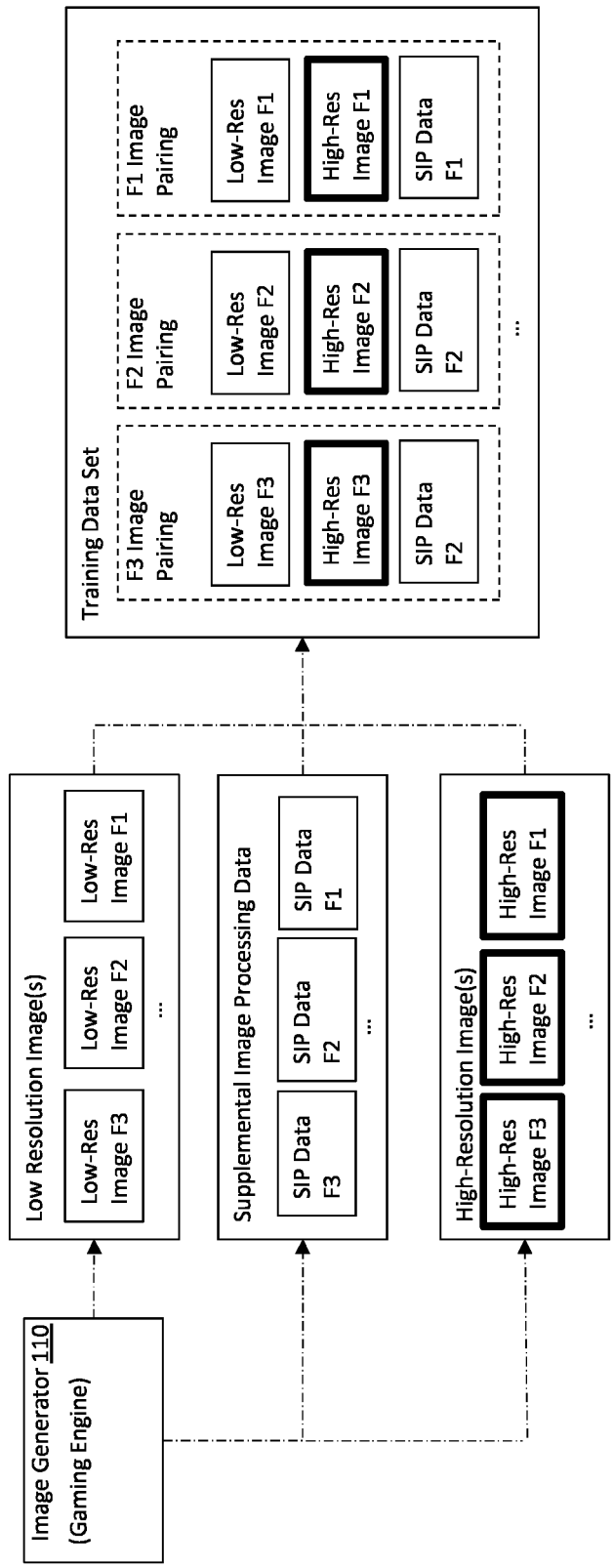
FIG. 7 illustrates an example of a processing flow associated with generating training data sets comprising low and high-resolution image pairings, as well as supplemental image processing data.

Attention is now directed to the training data set generation flow 700 of FIG. 7. This embodiment illustrates how the different training data set image pairings can also be augmented or supplemented with additional imaging data. For example, as shown, the image generator 110 generates supplemental image processing data for one or more of the image frames that are processed and used for the image pairings (e.g., SIP Data F1 for frame 1, SIP Data F2 for frame 2, SIP Data F3 for frame 3, etc.).

The supplemental image processing data that is generated and supplemented with the image pairings can include any image processing data that is usable by a super-resolution model for inputs corresponding to parameters or other inputs of an algorithm used by the super-resolution models when performing super-resolution on low-resolution images to generate high-resolution images. By way of example, the supplemental image processing data may include motion vector data, jittered image data, and/or depth data corresponding to the rendering of the low-resolution image set.

The supplemental image processing data may be included as metadata for the lower resolution image, for example, or provided as a separate data file that is referenced by and linked to by the image pairings.

The supplemental image processing data is used by the image generator, in some instances, to modify how the output images are generated. By way of example, MIP bias levels can be used and modified to cause higher-resolution textures to be generated as part of the high-resolution output from the initial low-resolution images. While mipmaps or MIP maps are sequences of progressively lower resolution representations of previous images, the MIP bias levels are used to interpolate the texturing differences between different resolution images and can be applied to different algorithms used by the image generator to perform the interpolation.

Other supplemental image processing data that can be used includes antialiasing parameters. Antialiasing parameters are available from the image generator such as the gaming engine. Antialiasing parameters can be used when performing antialiasing processes, for example, when generating high-resolution outputs that better match the expected low-resolution inputs during inference and to help smooth out edges in the high-resolution images.

By way of another example, post-processing effect data, which can be used to perform post-processing (e.g. motion blur) may be included in the generation of both low-resolution and high-resolution outputs. Post-processing effect data is available from the image generator such as the gaming engine. In some instances, the system is trained on training data sets that include supplemental post-processing instructions for performing the post-processing (e.g., motion blur) on output high-resolution images after the super-resolution processes have already been performed and to obtain the high-resolution image that includes attributes of the post-processing (e.g., motion blur). In this regard, it will be appreciated that the image generator and super-resolution model can be modified to apply the post-processing effects during inference or after the super-resolution has already been performed. That said, during the training of the model, it has been found that it is better to train on non-blurred images (without applying the post-processing effects during inferencing) and to apply blurring (with the post-processing effect data) after the super-resolution processing has been performed.

Figure 8:
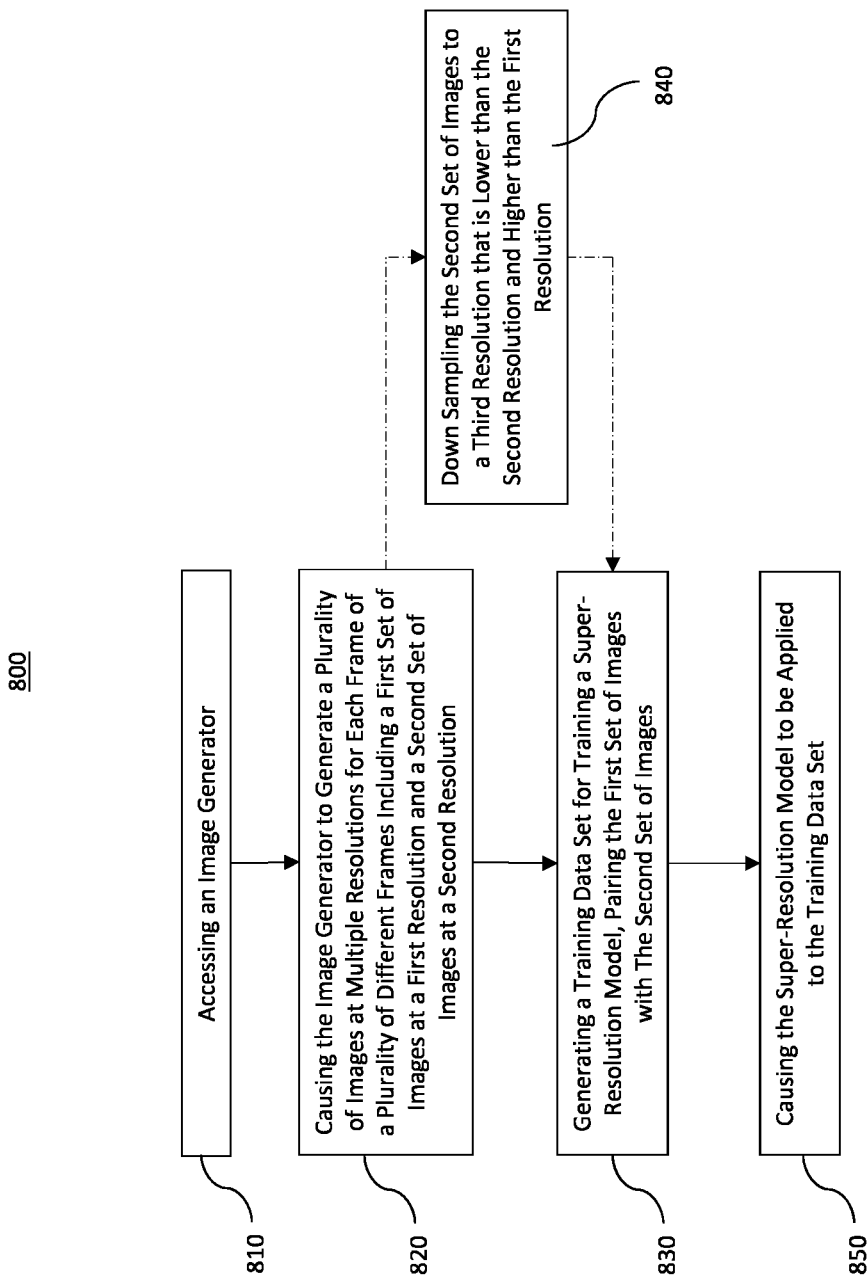
FIG. 8 illustrates an example of a flow diagram of acts associated with methods for generating training data sets comprising low and high-resolution image pairings and for applying super-resolution models to the training data sets.

Attention is now directed to FIG. 8, which illustrates a flow diagram 800 of a plurality of acts associated with methods for generating and using a super-resolution training data set of image pairings obtained from an image generator such as a gaming engine. The illustrated acts are implemented by a computing system having a processor and storage that stores computer-executable instructions that are executable by the processor to implement the functionality of the referenced acts.

The first illustrated act includes the computing system accessing an image generator (act 810), such as a gaming engine or another type of image generator that is configured to generate images by processing image data and that outputs the generated images in a stream of sequential frames at a resolution. The image generator may be integrated into a part of the computing system or, alternatively, remotely accessed by the computing system.

The next act (act 820) includes the computing system causing the image generator to generate a plurality of images at multiple resolutions for each frame of a plurality of different frames from a stream of sequential frames, including a first set of images at a first resolution and a second set of images at a second resolution that is a relatively higher resolution than the first resolution. This may be accomplished by modifying the code of the image generator and/or by building a new image generator to process image data and generate the referenced output image sets at different resolutions.

In some instances, act 820 is implemented by causing the image generator to generate the first image(s) of the first image set and the corresponding second image(s) of the second image set simultaneously. In alternative embodiments, upon determining that the image generator can support a special rendering mode in which the image generator guarantees exact replication of frames for subsequent runs of gameplay or a simulation at different resolutions, such that frames of the subsequent runs can be exactly matched at their different resolution, the system may cause the image generator to generate the different image sets at the different resolutions asynchronously.

The different resolutions of the first and second image sets can be any resolution, wherein the second resolution is relatively higher than the first resolution. In some embodiments, the first or second resolution is a resolution of 640×480 pixels, 1280×720 pixels, 1920×1080 pixels, 3840×2160 pixels (4 k), 7680×4320 pixels (8 k), or another resolution. It will be appreciated, however, that these are only a few examples of different resolutions that could be used, as there are almost infinite resolutions that could be used in the disclosed embodiments.

Next, the system generates a training data set for training a super-resolution model (act 830) by pairing the first and second image sets into unique image pairings in which each unique image pairing in the training data set comprises (i) a first image of a unique frame of the plurality of frames at the first resolution and (ii) a corresponding second image of the unique frame at a second resolution that is higher than the first resolution.

In some instances, this includes supplementing the training data set with supplemental image processing data associated with rendering the first set of images (i.e., the low-resolution images) corresponding to the plurality of different frames. This supplemental image processing data may be used as inputs for the super-resolution model image processing algorithms. The supplemental image processing data may comprise, for example, motion vector data corresponding to the rendering of the low-resolution images, jittered image data corresponding to the rendering images or other anti-aliasing data, and/or depth data corresponding to the rendering of the low-resolution images.

Additionally, the system may optionally down sample the second set of images (i.e., the high-resolution images) from the second resolution to a third resolution that is a relatively higher resolution than the first resolution and prior to pairing the first set of images with the second set of images into the unique image pairings of training data (act 840). In such scenarios, for example, each unique image pairing in the training data set will comprise (i) the first image of the unique frame of the plurality of frames at the first resolution and (ii) the corresponding second image of the unique frame at the third resolution that is higher than the first resolution but which is lower than the second resolution.

This optional implementation of generating a super high-resolution image that is down-sampled to a target resolution can be a particularly useful optimization to further expedite the training of the super-resolution models by providing training data that includes target high-resolution images that can be used to drive the super-resolution models to a desired threshold of convergence more quickly, as the down sampled high-resolution images more closely resemble the desired target outputs of the super-resolution models. When the models are applied to the training data set, they will modify the weights of the algorithms more appropriately to generate desired target outputs based on the low-resolution and supplemental image processing data inputs. In these instances, the second resolution may be at least double the third resolution (e.g., 8 k vs 4 k) and/or at least double the first resolution.

The final illustrated act (act 850) includes causing the super-resolution model to be applied to the training data set. As noted above, the super-resolution model is configured with image processing algorithms having weights that are applied by the super-resolution model when upscaling images from a first resolution to a second resolution, wherein application of the training data set to the super-resolution model causes the super-resolution model to modify the weights based on differences between (i) the second image of each image pairing in the training data set with (ii) an upscaled output image of the corresponding first image of each image pairing in the training data set that is generated by the super-resolution model applying the image processing algorithms to the first image of each image pairing and, optionally, supplemental image processing data of the training data (if any).

This process will continue, in some instances, until the model reaches a desired threshold of convergence between the model outputs (e.g., high-resolution outputs generated by upscaling the low-resolution images of the training data set image pairings) and the target model outputs (e.g., the high-resolution images of the training data set image pairings).

Figure 9:
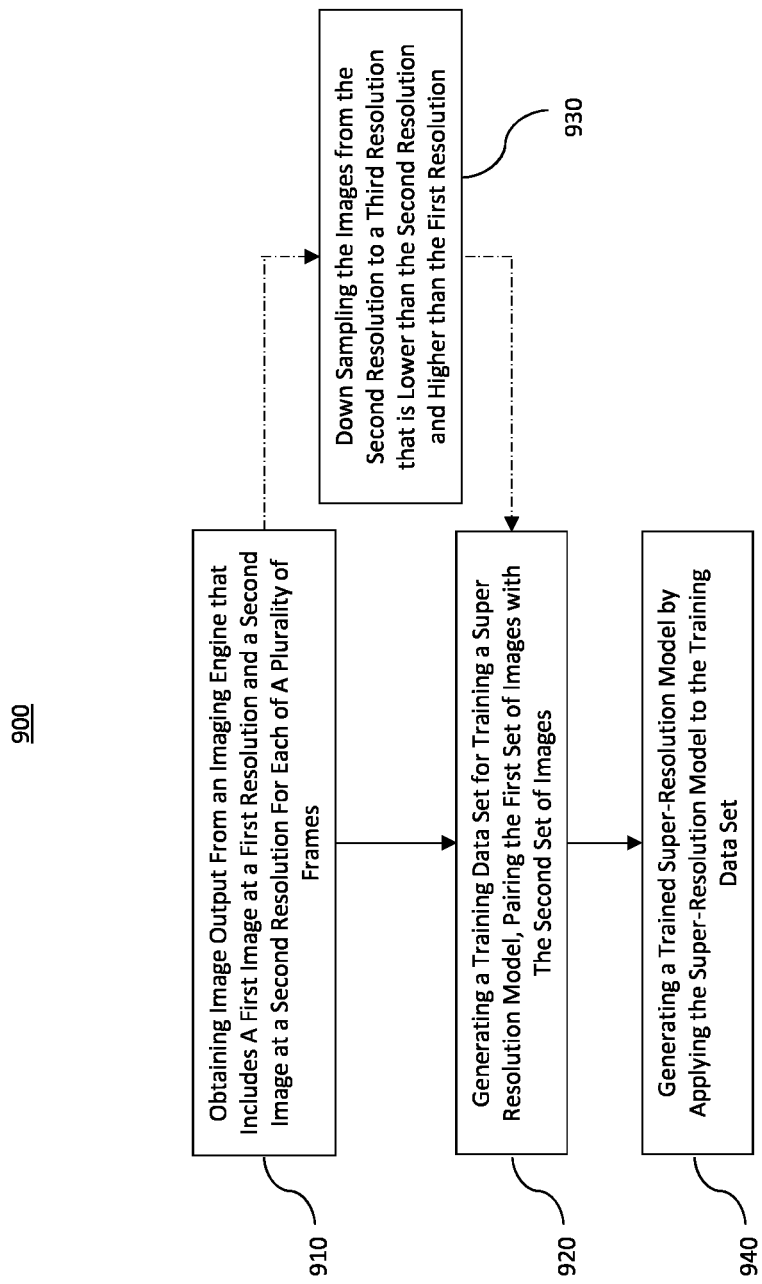
FIG. 9 illustrates an example of a flow diagram of acts associated with methods for generating training data sets comprising low and high-resolution image pairings and for generating trained super-resolution models by applying super-resolution models to the training data sets.

Attention is now directed to FIG. 9, which illustrates another flow diagram 900 that includes acts associated with methods for generating super-resolution training data and for generating a trained super-resolution model with the training data.

The acts of flow diagram 900 are implemented by a computing system having a processor and storage that stores computer-executable instructions that are executable by the processor to implement the functionality of the referenced acts.

The first illustrated act includes obtaining image output from an imaging engine (e.g., a gaming engine) that generates image output from processing image data (act 910). As indicated above, the image output that is obtained comprises a first image at a first resolution and a second image at a second resolution for each frame from a set of frames selected from a sequential series of frames of the image data, wherein the second resolution is a higher resolution than the first resolution. This act may be performed similarly to the performance of acts 810 and 820, described above.

Next, the system generates a training data set for training a super-resolution model to generate upscaled images at the second resolution from input images at the first resolution by pairing the first image with the second image of each frame from the set of frames (act 920). This act may be performed similarly to the performance of act 830, described above. This may include, for example, processes for down sampling super high-resolution images (act 930), similar to act 840, described above.

Finally, the system generates a trained super-resolution model by applying the super-resolution model to the training data set (act 940). This will include causing the weights of image processing algorithms incorporated into the super-resolution model to be modified based on differences between (i) the second image of each image pairing in the training data set (i.e., the high-resolution image) with (ii) a corresponding upscaled output image of the first image of the image pairing in the training data set that is generated by the super-resolution model in response to the application of the image processing algorithms to the first image of said each image pairing and, optionally, the supplemental image processing data of the training data (if any).

The trained super-resolution model is then used or usable to perform additional super-resolution processing on new low-resolution images at a lower resolution to generate corresponding high-resolution images at a target resolution.

The target resolution may be the same as or similar to the resolution of the high-resolution images included in the training data set.

With regard to the foregoing, it is noted that the referenced training data is often described as being super-resolution training data that super-resolution machine learning models can be applied to. That said, it will be appreciated that this training data can include any image training data that can be used for performing discrete processes related to super-resolution, including upscaling, anti-aliasing, or other processes related to enhancing the resolution or display properties of an image at a resolution.

Additionally, the foregoing techniques that are described herein for generating training data sets of image pairings at different resolutions can also be applied to other types of image processing for generating and pairing different sets of images for sequences of frames processed by gaming engines and other image generators, wherein the different sets of images comprise different formats, styles, orientations, textures and/or other configurations and are paired into training data image pairings by frame, to thereby facilitate the training of machine learning models that are applied to the training data for improving the overall image processing performance of the models when performing corresponding image processing (e.g., changing size, changing orientation, cropping, stylizing, coloring, filtering, applying depths or textures, masking, or other image processing).

The disclosed techniques can help overcome many of the foregoing problems associated with obtaining training data. In particular, by causing a gaming engine or another imaging engine to generate two different image sets at different resolutions for the same plurality of frames, it is possible to generate very high quantities of training data at a relatively very low computational cost, particularly as compared to conventional techniques. This is also particularly helpful for obtaining training data that is germane to the final end-use scenarios where the super-resolution models will be used, e.g., gaming environments. This enables the models to reach a desired threshold of convergence more quickly with the target outputs of the gaming environments than would be possible when using training data that is generic and not specifically tailored to the gaming environment. This is also one benefit of supplementing the training data with the supplemental image processing data mentioned above (e.g., jittered image data, motion vector data, depth data).

It will be appreciated that the disclosed methods may be practiced by a computer system comprising a computer including one or more processors and computer-readable media such as computer memory. In particular, the computer memory may store computer-executable instructions that when executed by one or more processors cause various functions to be performed, such as the acts recited in the embodiments.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read-only memory (ROM), programmable read-only memory (EEPROM), compact disk ROM (CD-ROM), or other optical disk storage (such as compact disks (CDs), digital video disks (DVDs), etc.), magnetic disk storage or other magnetic storage devices, or any other hardware storage devices which can be used to store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, as described herein, the computer properly views the connection as a transmission medium. Transmission media can include a network and/or data links that can be used to carry or desired program code means in the form of computer-executable instructions or data structures and which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a network interface card (NIC)), and then eventually transferred to computer system RAM and/or less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers (PCs), desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating training data for super-resolution model training and for facilitating training of a super-resolution model with the training data, the method comprising:
    accessing an image generator that generates images by processing image data and that outputs images in a stream of sequential frames at a resolution;
    causing the image generator to generate a plurality of images at multiple resolutions for each frame of a plurality of different frames from the stream of sequential frames, including a first set of images at a first resolution and a second set of images at a second resolution that is a relatively higher resolution than the first resolution; and
    generating a training data set for training a super-resolution model by pairing the first set of images with the second set of images into image pairings of the training data set, each image pairing in the training data set comprising (i) a first image of a unique frame of the plurality of different frames at the first resolution and (ii) a corresponding second image of the unique frame at a resolution that is higher than the first resolution;
    causing the super-resolution model to be applied to the training data set, the super-resolution model being configured with image processing algorithms having weights that are applied by the super-resolution model when upscaling images from the first resolution to the second resolution, wherein application of the training data set to the super-resolution model causes the super-resolution model to modify the weights based on differences between (i) a second image of each image pairing in the training data set with (ii) an upscaled output image of a corresponding first image of said each image pairing in the training data set that is generated by the super-resolution model applying the image processing algorithms to the first image of said each image pairing.

2. The method of claim 1, wherein the method further comprises:
    causing the image generator to generate the first image and the corresponding second image of each unique image pairing in the training data set substantially simultaneously.

3. The method of claim 1, wherein the method further comprises:
    supplementing each image pairing in the training data set with supplemental image processing data associated with rendering the first set of images of the plurality of different frames, the supplemental image processing data being used as inputs for the image processing algorithms.

4. The method of claim 3, wherein the supplemental image processing data comprises motion vector data obtained from the image generator and corresponding to rendering the first set of images of the plurality of different frames.

5. The method of claim 3, wherein the supplemental image processing data comprises jittered image data obtained from the image generator and corresponding to rendering the first set of images of the plurality of different frames.

6. The method of claim 3, wherein the supplemental image processing data comprises depth data corresponding to rendering the first set of images of the plurality of different frames.

7. The method of claim 1, wherein the method further comprises:
    down sampling the second set of images from the second resolution to a third resolution that is a relatively higher resolution than the first resolution prior to pairing the first set of images with the second set of images into the unique image pairings of training data and such that each unique image pairing in the training data set comprises (i) the first image of the unique frame of the plurality of frames at the first resolution and (ii) the corresponding second image of the unique frame at the third resolution that is higher than the first resolution but which is lower than the second resolution.

8. The method of claim 1, wherein the image generator comprises a gaming engine.

9. The method of claim 1, wherein the method further comprises:
    determining the image generator is capable of operating in a special rendering mode in which the image generator guarantees exact replication of frames for subsequent runs of a gameplay or a simulation at different resolutions, such that frames of the subsequent runs can be exactly matched at their different resolutions; and
    causing the image generator to generate the first set of images asynchronously and prior to generating the second set of images.

10. A computing system comprising:
    a hardware processing system comprising a hardware processor; and
    one or more storage devices storing executable instructions that are executed by the hardware processing system for causing the computing system to perform operations comprising:
        obtaining image output from an image generator that generates image output from processing image data, the image output comprising a first image at a first resolution and a second image at a second resolution for each frame from a set of frames selected from a series of frames of the image data, the second resolution being a higher resolution than the first resolution;
        generate a training data set of image pairings for training a super-resolution model to generate upscaled images from input images at the first resolution by pairing the first image with the second image of each frame from the set of frames; and
        generate a trained super-resolution model by applying the super-resolution model to the training data set to cause weights of image processing algorithms incorporated into the super-resolution model to be modified based on differences between (i) the second image of each image pairing in the training data set with (ii) a corresponding upscaled output image of the first image of each image pairing in the training data set that is generated by the super-resolution model in response to applying the image processing algorithms to the first image of each image pairing.

11. The computing system of claim 10, wherein the operations further comprise causing the image generator to generate the first image and the second image of each unique image pairing in the training data set simultaneously.

12. The computing system of claim 10, wherein the operations further comprise causing the image generator to generate the first image of each image pairing prior to generating the second image of each image pairing.

13. The computing system of claim 10, wherein the operations further comprise including supplemental image processing data to one or more unique image pairing in the training data set, wherein the supplemental image processing data is used as inputs for the image processing algorithms during training of the super-resolution model.

14. The computing system of claim 13, wherein the supplemental image processing data comprises motion vector data.

15. The computing system of claim 13, wherein the supplemental image processing data comprises jittered image data.

16. The computing system of claim 13, wherein the supplemental image processing data comprises depth data.

17. The computing system of claim 10, wherein obtaining image output from the imaging engine includes down sampling the second image of each image pairing from a third resolution to the second resolution.

18. The computing system of claim 17, wherein the second resolution is at least double the third resolution.

19. A computing system comprising:
a hardware processing system comprising a hardware processor; and
one or more storage devices storing executable instructions that are executed by the hardware processing system for causing the computing system to perform operations for generating training data for super-resolution model training and for facilitating training of a super-resolution model with the training data, the operations comprising:
accessing a gaming engine that generates images by processing image data and that outputs images in a stream of sequential frames at a resolution, the gaming engine being capable of generating replication of the sequential frames of the image data for subsequent runs of a gameplay or a simulation at different resolutions, such that the sequential frames of the subsequent runs can be exactly matched at their different resolutions;
causing the gaming engine to generate a plurality of images at multiple resolutions, asynchronously, for each frame of a plurality of different frames from the stream of sequential frames, including a first set of images at a first resolution and a second set of images at a second resolution that is a relatively higher resolution than the first resolution; and
generating a training data set for training a super-resolution model by pairing the first set of images with the second set of images into image pairings of the training data set, each image pairing in the training data set comprising (i) a first image of a unique frame of the plurality of different frames at the first resolution and (ii) a corresponding second image of the unique frame at a resolution that is higher than the first resolution, the first image and the second image of the unique frame being generated asynchronously from the subsequent runs of the gameplay or the simulation.

* * * * *